(No Model.)
H. R. BRIED.
HANGING DEVICE FOR CLOTHES LINES.
No. 398,490. Patented Feb. 26, 1889.
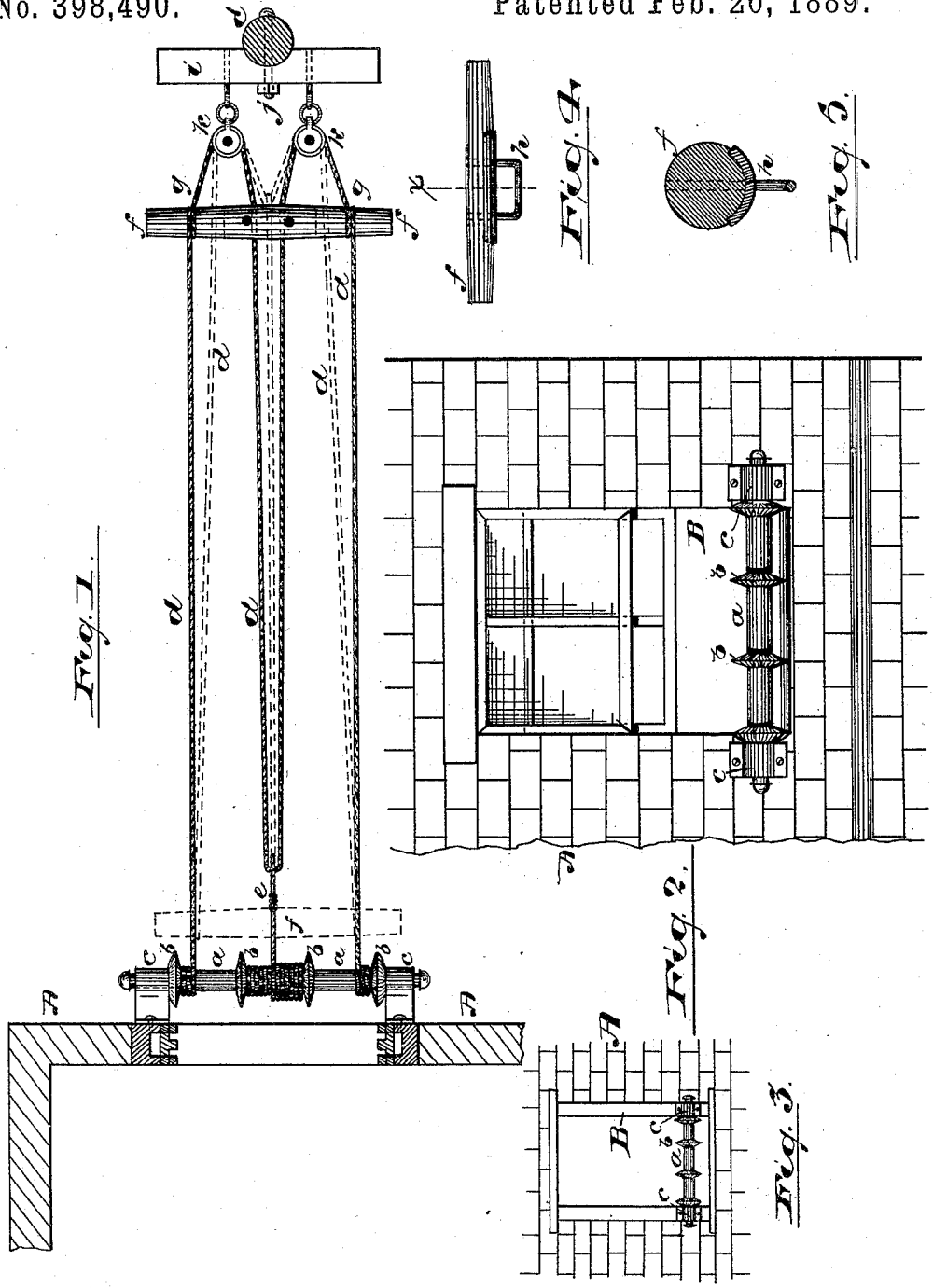
WITNESSES:
E. L. Sperman
Alfred Gartner
INVENTOR:
Henry R. Bried,
BY Drake & Co. ATT'YS.

UNITED STATES PATENT OFFICE.

HENRY R. BRIED, OF NEWARK, NEW JERSEY.

HANGING DEVICE FOR CLOTHES-LINES.

SPECIFICATION forming part of Letters Patent No. 398,490, dated February 26, 1889.

Application filed May 2, 1888. Serial No. 272,554. (No model.)

*To all whom it may concern:*

Be it known that I, HENRY R. BRIED, a citizen of the United States, residing at Newark, in the county of Essex and State of New Jersey, have invented certain new and useful Improvements in Hanging Devices for Clothes-Lines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to that class of clothes-line holders designed to be fastened to a window casing or frame and to enable two or more lengths of line to be used at the same time.

In the accompanying drawings, in which similar letters of reference indicate like parts in each of the several figures, Figure 1 is a top plan or view of a clothes-line hanger embodying my improvements. Fig. 2 is an elevation showing a window of a house with the hanger attached to the walls of the house. Fig. 3 is an elevation showing the hanger attached to a window-casing. Fig. 4 is a front view of the separator and tightener, and Fig. 5 is a sectional view through line X of Fig. 4.

In said drawings, A represents the walls of a house.

B represents a window-casing.

C represents a post or upright to which the outer end of the line is secured.

*a* is a reel divided into sections by annular disks *b b b b*, and revolves in bearings *c c*. These bearings can be secured directly to the wall of a house, as seen in Fig. 2, or they can be secured to the window-casing, as seen in Fig. 3.

*d* is a clothes-line, and *e* is a drawing and tightening line.

*f* is a separator, around which, near the ends, are wound or secured the lines *d d*, as at *g*, Fig. 1.

*h* is a loop or fork on the under side of said separator and through which the lines run loosely until the separator reaches its outer limit, when the inner lines, *d d*, are bound against the sides of the loop *h* on the separator, which tightens all the lines *d*.

*i* is a cross bar or block firmly secured to the post C by a bolt, *j*, or in any other desired manner. *k k* are pulley-blocks connected by a ring, with eyebolts secured in said cross-bar, as shown in Fig. 1.

In preparing the lines and hangers for use one end of the line is first secured to the reel at one end. It is then extended out to nearly the distance at which the post or upright is to be placed and wound around or secured to the separator *f* at or near the end, then through one of the pulley-blocks *k*, thence through the loop *h* on the under side of the separator to and through an eye or ring in the end of the drawing-line *e*, thence back through loop *h* to and through the other pulley-block to the end of the separator, where it is wound and secured, and thence to the reel and at the opposite end from whence it started, where it is secured. To the central section of the reel is secured the line *e*. This line *e* is wound on the middle section and so arranged as to wind and unwind in a direction opposite to that of the line *d* on the two outer sections.

In place of the post C the cross bar or block *i* may be secured to the wall of another building, as may be desired.

The reel can be secured upon the walls of the house; but I prefer to secure it on the inner edge of the window-frame, so that the outer disks will be inside the frame.

The reel can be placed at any height desired; but, for convenience, it is better to place it so that the operator need not stoop.

On commencing to hang out clothes to dry the separator will be drawn up to the position shown in dotted lines, Fig. 1. The clothes are placed on the two outside lines, *d d*. As fast as the clothes are placed on the line, the reel is turned, and when the separator has reached the limit of its travel all the lines will have been drawn tight, as before described. The reel can, if required, be held at any point by a pin or any other means.

Having thus described my invention, what I claim as new is—

1. In a clothes-line holder, the combination, with a reel adapted to be secured to a house and a clothes-line secured to said reel, of a separator secured at or near its ends to the clothes-line, pulley-blocks through which the clothes-line passes, eyebolts adapted to be secured in a post or wall of a house, and a drawing-rope secured at one end to the middle of the reel and at the other end at or near the middle of the clothes-line, substantially as and for the purposes set forth.

2. In a clothes-line holder, the combination, with a reel adapted to be secured to a house, of a cross-bar adapted to be secured to a post or wall of a house, eyebolts in said cross-bar, pulley-blocks connected to said eyebolts, a clothes-line secured to said reel and passing over and through the pulley-blocks, and a drawing-rope secured at one end to the middle of said reel and at the other end at or near the middle of said clothes-line, substantially as and for the purposes set forth.

In testimony that I claim the foregoing I have hereunto set my hand this 11th day of April, 1888.

HENRY R. BRIED.

Witnesses:
 CHARLES H. PELL,
 OLIVER DRAKE.